(12) United States Patent
Lee

(10) Patent No.: US 6,520,775 B2
(45) Date of Patent: Feb. 18, 2003

(54) FIXTURE AND METHOD FOR TRAINING AND USE OF APICAL POSITION LOCATOR

(76) Inventor: Charles Q. Lee, 8343 Acuff La., Lenexa, KS (US) 66215

( * ) Notice: Subject to any disclaimer, the term of this patent is extended or adjusted under 35 U.S.C. 154(b) by 0 days.

(21) Appl. No.: 09/848,739

(22) Filed: May 3, 2001

(65) Prior Publication Data

US 2002/0164568 A1 Nov. 7, 2002

(51) Int. Cl.[7] .............................................. G09B 23/28
(52) U.S. Cl. ........................ 434/263; 434/262; 600/547
(58) Field of Search ................................ 434/262, 263, 434/264, 267, 270, 274; 600/547

(56) References Cited

U.S. PATENT DOCUMENTS

| | | | | |
|---|---|---|---|---|
| 1,048,382 A | * | 12/1912 | Allen .......................... | 434/263 |
| 1,948,059 A | * | 2/1934 | Baugh ......................... | 434/263 |
| 1,967,786 A | * | 7/1934 | Schultz ........................ | 434/263 |
| 2,005,114 A | * | 6/1935 | Spitzer et al. ............... | 434/263 |
| 2,256,667 A | * | 9/1941 | Doret .......................... | 434/263 |
| 2,674,802 A | * | 4/1954 | Williams ..................... | 434/263 |
| 3,753,434 A | * | 8/1973 | Pike et al. ................... | 433/224 |
| 3,947,967 A | * | 4/1976 | Satake ......................... | 434/263 |
| 3,950,852 A | * | 4/1976 | Henning ...................... | 434/263 |
| 4,102,047 A | * | 7/1978 | Walker ........................ | 434/263 |

OTHER PUBLICATIONS

Ryan Walker –University of Missouri–Kansas City School of Dentistry—Apex Locator Simulation: A comparison of the accuarcy various techniques used to simulate in–vivo use of apex locators.*

* cited by examiner

Primary Examiner—Derris H. Banks
Assistant Examiner—Dmitry Suhol
(74) Attorney, Agent, or Firm—Wm. Bruce Day

(57) ABSTRACT

A fixture and method for use in dental training is disclosed which assists a student in learning how to determine the position of a root canal apex. The fixture and method include a tooth having a root canal and root apex with an electrically-conductive medium set around the root and root apex and securing the tooth in a fixture. An alternative embodiment uses first and second conductive mediums wherein the first medium is set around the root and root apex. The tooth is set into a fixture containing a second electrically-conductive medium. An electronic apical position locator is connected to an endodontic reamer and to the electrically-conductive medium in the fixture so that when the reamer is advanced through the root canal to the root apex, the electronic locator so indicates. Some locators are sufficiently sophisticated to indicate the distance of the reamer tip from the apex. In others an electrical circuit is closed causing the apical position locator to so indicate. The electrically-conductive media may be selected to be partially radiographically opaque to aid in the training of the use of the apical position locator. The conductive media is, selected to match or approximate the impedance levels of human tissue and correspond to impedance levels capable of being sensed by the electronic circuit of the apical position locator. Practice with this fixture and method enables a student to gain experience in determining the location of a root apex without the necessity to practice upon a live patient.

8 Claims, 2 Drawing Sheets

FIXTURE AND METHOD FOR TRAINING AND USE OF APICAL POSITION LOCATOR

FIELD OF THE INVENTION

The present invention related to dental equipment, and more particularly, to teaching tools for the use of endodontic apical location equipment.

BACKGROUND OF THE INVENTION

Precise location of the root apex is vitally important for the correct endodontic treatment of a tooth. If the endodontic procedure of extracting and cleaning the pulp tissue from a root canal is performed at a length short of the apex, pulp tissue may remain in the canal. Failure to remove all pulp tissue may lead to infection and pain for the patient and necessitate additional surgery. If the endodontic procedure is performed beyond the length of the root apex, the reamer may penetrate into the periodontal ligament leading to pain and extreme sensitivity to the patient.

Multiple methods are currently utilized to determine the location of the apex during an endodontic procedure on a live patient. One is the use of x-ray radiographs of the tooth while a metal endodontic reamer is located in the root canal. This allows the dentist to visually compare the length of the metal reamer to the location of the end of the root to determine the location of the root apex. This method may be unreliable and not cost-effective.

A second method is to use an electrically aided apical position location. Electrical aid approaches include those described in U. S. Pat. No. 5,759,159 to Masreliez, U.S. Pat. No. 5,211,556 to Kobayashi et al, and U.S. Pat. No. 6,059,569 to Otsuka, all incorporated herein by reference. These patents describe apical position locators utilizing impedance measurements to determine the location of the root apex. In the electrical approach, an electrically-conductive probe is inserted into the root canal and a second electrode is attached to the patient's body, such as by hanging a hook shaped electrode from the patient's mouth. As the probe is inserted into the root canal and advanced through the root canal to the root apex, the impedance is measured. Once the impedance reaches a determined range or value, the location of the apex is indicated. The electrical approach for determining apex location is currently the standard technique used in endodontic practice and taught in dental schools.

Instruction in the use of electrical apical position locators has generally required practice upon live patients in need of endodontic treatment. Performing endodontic procedures on healthy teeth is unethical and represents dental malpractice. Endodontic patients are often in pain prior to seeing the dentist, and are usually apprehensive about the endodontic procedure and less than enthusiastic about serving as subjects in dental instruction on the use of apical position locators. The additional pain which may be encountered, or the mere potential for such additional pain, is an effective disincentive to enthusiastic participation.

The number of endodontic procedures that a graduate student in endodontics or a doctoral student in general dentistry performs on live patients is severely limited by the number of willing participants in need of such procedures. Graduate endodontists and general dentists would benefit from additional training and instruction in the use of apical position locators in a realistic setting. In turn, the endodontic patient would benefit from the additional training received by the practitioner.

Prior to this invention, no adequate surrogate for the live patient has been developed for instruction in the use of electrical apical position locators. U.S. Pat. No. 5,503,562 describes a transparent endodontic inspection block which allows the endodontist or endodontic student to simulate cleaning out the root canal. The student utilizing the inspection block could look through the side of the inspection block and locate the root apex. This invention is not designed to train apex location techniques and does not represent realistic conditions of endodontic treatment. U.S. Pat. No. 4,137,633, issued in 1979, disclosed a resilient mass located at the apex of a block of transparent material to simulate the tactile sensation of the periodontal membrane located at the apex of a natural tooth. Thus, prior devices permitted students to visually locate a simulated apex through a transparent block and to tactually locate a simulated apex through the addition of a resilient mass located at the apex. No known prior devices have disclosed providing a simulation of a live tooth and human tissue to practice using an electrical apical position locator.

BRIEF SUMMARY OF THE INVENTION

The present invention provides an improved device and method for the training of the use of an apical position locator. The invention uses a real or replicated tooth with a root and a root canal having an apex generally coincident with the root tip. The inventor's concept is to provide a medium into which the tooth is set which mimics the electrical impedance of human tissue so that an electronic apical locator may be used. In a first embodiment, and the broadest concept of the invention, the tooth is mounted in a single, rigid conductive medium which mimics the conductivity characteristics of human tissue. An alternative embodiment uses a first highly conductive medium wrapped around the root tip to cover the apex and the tooth and first conductive medium is then set in a fixture containing a rigid, second less conductive medium which holds the tooth suitably for manipulation training purposes. An electronic apical position locator has one lead connected to an endodontic reamer and the other to an electrode blade extending from the medium. When the reamer is inserted in the root canal and extended so that the reamer tip contacts the conductive medium at the canal apex, the electronic circuit of the apical position locator is closed, the impedance is measured and the apex is appropriately indicated by the apical position locator. A more detailed understanding of the invention will be obtained from the following description of the preferred embodiments taken in conjunction with the attached drawings.

This invention utilizes an actual or replicated human tooth with an electrically equivalent replicated human tissue medium to provide a realistic simulator for training in the use of an electrical apical position locator. Patient volunteers do not normally clamor for dentists-in-training to practice root canals upon them, so this invention allows the endodontic student the opportunity to practice in a realistic environment. The user may select a partially radiopaque electrically conductive medium, which allows the student to also simulate the determination of the location of the root apex through the use of an x-ray radiograph.

DETAILED DESCRIPTION OF THE PREFERRED AND ALTERNATE EMBODIMENTS

Figure 1:
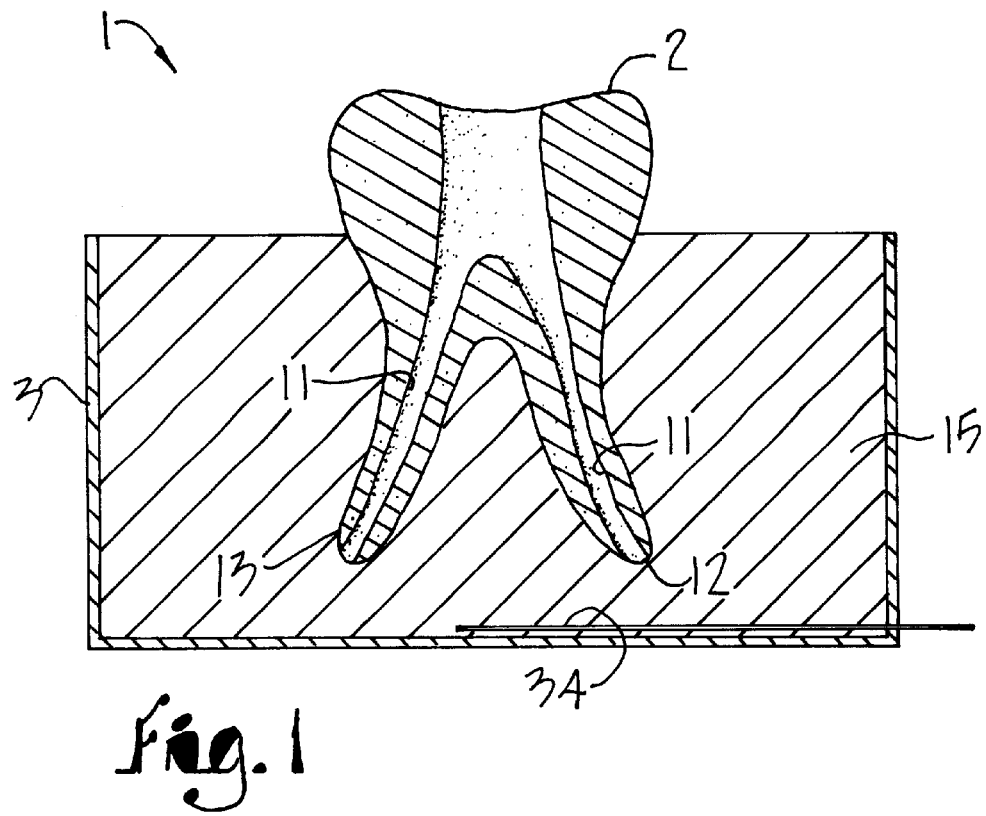
FIG. 1 is a longitudinal sectional view of a preferred embodiment of the present invention.
Figure 2:
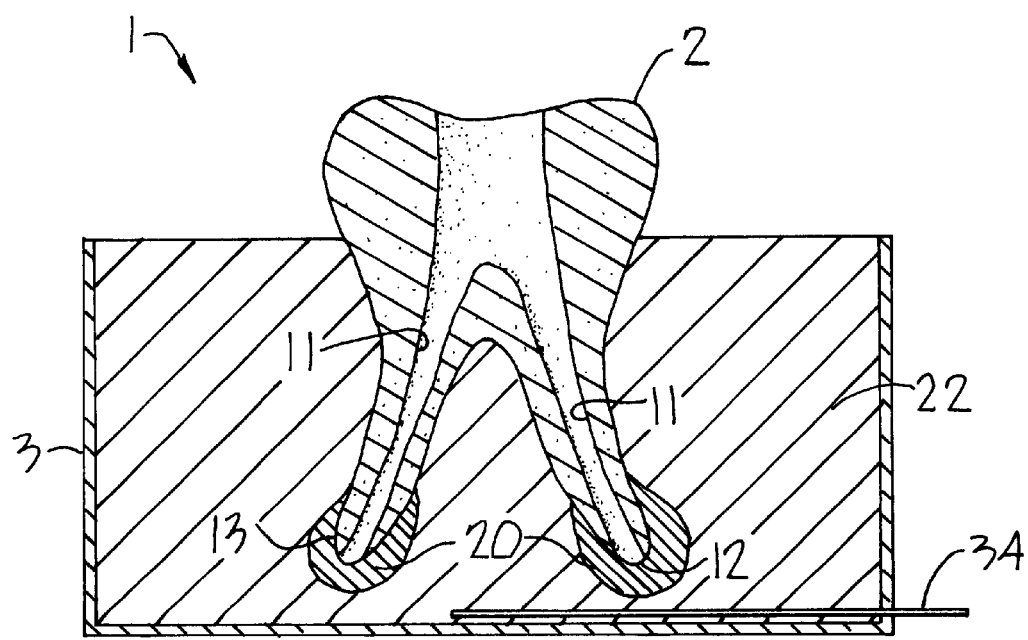
FIG. 2 is a longitudinal cross-section of alternative embodiment.

Referring to FIG. 1, the reference numeral 1 generally indicates a training device according to the present invention which is useful to create an effective simulation of a tooth in a patient so that a student may practice using an electronic apical position locator. The training device 1 consists of a tooth 2 which may be an extracted human tooth or a replica, which is set in a fixture 3 and connected to an apical position locator 4, FIG. 3, as hereinafter described. In more detail, an exemplary tooth 2 is a pre-molar with two roots 10, each with a root canal 11 ending to an apex 12 near the tip 13 of each root. Other tooth forms are equally suitable. In a live tooth, the root canal 11 is filled with nerve pulp tissue. The tooth is set into a periodontal ligament which surrounds the root 10 and acts as a barrier between the root 10 and the bone. In a patient the periodontal or tissue around the tooth is moist and electrically more conductive than the tooth itself, thereby enabling the use of an electronic apical position locator 4 which relies on the measurement of impedance to determine when the apex is reached. When the measuring probe electrode approaches the apex, the magnitude of impedance or the phase angle of the impedance between the measuring probe and oral probe electrode starts to change. The detector identifies the apex when the designated range or the frequency of impedance is reached.

In the illustrated example, the tooth 2 is a "dead" tooth which has been extracted from a patient and is not supported by live periodontal ligament or other live conductive materials. As shown in FIG. 1, the tooth is set in a container or fixture 3 which is selected for ease of manipulation by a student. Preferably, a single setting material 15 is selected which provides sufficient rigidity to support the tooth 2 during handling and practice root canal procedures. Ideally, the selected material 15 should also replicate the range of impedance of live human tissue in order to provide an impedance in the range of the apex locator setting. Since there are many different type of apex locators on the market, a single conductive material having an impedance not in the range of live human tissue can also be used for some apex locators of simple design. Generally, the selected material 15 should replicate the conductivity of live human tissue in order to provide an impedance generally matched to the impedance of live tissue. Because an electric apex locator of advanced design contains circuitry and components to measure the impedance of human tissue and then compare the impedance value to the impedance values obtain by a measuring electrode inserted into the root canal, a closer match of impedance between the material 15 and the circuit of the apical locator 4 in the locating of apex. A suitable range for the volume resistivity of the medium 15, 20 and 22 supporting the tooth 2 in the fixture 3 be in the range from 10E15 to 10E-3 ohm/cm.

To obtain a suitable support medium, conductive material is mixed with different binder. The binder can be plastic resin, polymer resin, plaster, stone or clay et al. Various types and concentrations of conductive materials in the binder have been conceived and include carbon, carbon fiber, graphite, silver powder, metal or metal coated fiber or powder or flakes, silicon, silicon dioxide, germanium, selenium, conductive polymer and others in slight to significant concentrations. If a radiopaque support medium can be tolerated, then a high metallic content or radiopaque chemical such as barium sulfate is indicated. If radio transparency is needed, then metallic content is limited and carbon or other no radiopaque content is increased to a proportion balancing strength, conductivity and human tissue impedance. The attribute of impedance matching is intended to bring impedance values into a range sensed by the circuit of the electronic apex locator.

A second embodiment of the present invention uses two conductive medium components. In the second embodiment, a first conductive medium 20 is applied to the root tip 13 to cover the apex 12, generally in a ball about the root tip 13. When applying the first conductive medium 20 to the root tip 13, care is exercised so as not to pack the medium 20 into the canal 11, but to merely cover the apex 12 as it intersects with the root 10. The preferred material of the first conductive medium 20 is a water based or a highly conductive material. The first conductive material can a mixer of water, clay or a highly concentrated carbon or metal powder plastics.

The tooth with its root tip coated with the first conductive medium is placed in a second conductive medium 22 which fills the The tooth with its root tip coated with the first conductive medium is placed in a second conductive medium 22 which fills the fixture 3. The second conductive medium is preferably a hard material mixed with a conductive element as mentioned before, typically a resin type material, so that it can hold the tooth in place for handling and practicing root canal treatment procedures.

The first conductive medium 20 and the second conductive medium 22 may possess radio opaque material if training utilizes radiographs to simulate use in a real patient. Such radio opaque material may include material such as metal fibers, metal-coated fibers, carbonaceous material, metallized glass or barium sulfate. The first conductive medium 20 and the second conductive medium 22 may possess materials of differing radio opacity to simulate the different radio opacity of the periodontal ligament and the bone in a patient.

Figure 3:
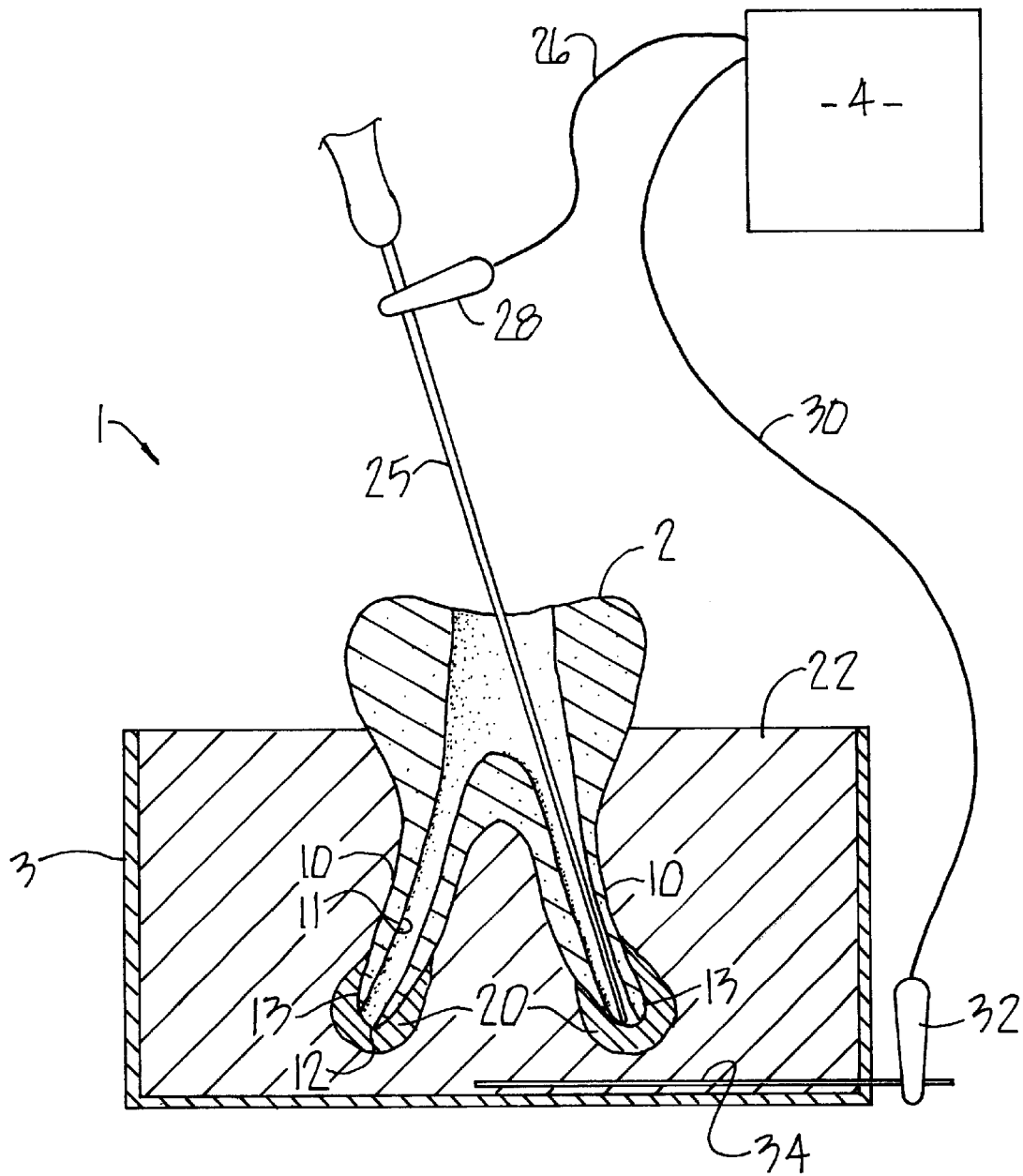
FIG. 3 is a longitudinal cross-section of alternative embodiment shown in connection with an electronic apex locator.

FIG. 3 shows the training device 1 in connection with an apical position locator 4. To enable the training device 1 to be utilized with the apical position locator 4, a measuring probe such as an endodontic reamer 25 is connected to the apical position locator 4 via leads 26 and a connector such an alligator clip 28. The apical position locator 4 is connected to the conductive medium such as the second conductive medium 22 via lead 30 and a connector such as alligator clip 32, connected to an electrode or probe 34 set in second conductive medium 22. In the illustrated example, apical position locator 4 indicates the closure of an electronic circuit when the endodontic reamer 25 contacts or almost reaches the conductive medium 20 at the apex 12. Then the resistance or impedance of these materials are measured, compared and calculated based on the pre-set formula in the apex locator. A final reading will indicate reaching the apex by the tip of the dental reamer. Normally, apical position locator 4 possesses sufficient sensitivity that it can determine the distance between the tip of the endodontic reamer 25 and the apex 12 and provides a visual readout of that distance.

In the practice of the invention, a tooth such as an extracted human tooth 2 is used to train a user by placing the tooth 2 into a container and supported therein by a conductive medium, such as the single medium shown in FIG. 1. Alternatively, a first conductive medium 20 can be molded around the root tip 13, being careful not to enter the canal 11 so that the location of the apex 12 is simulated. Next, the tooth 2 with first conductive medium 20 wrapped around the root 10 is placed in second conductive medium 22 in the fixture 3. The second conductive medium 22 is allowed to set so that it firmly holds tooth 2 in place. The apical position locator 4 is connected to the endodontic reamer 25 and the probe 34 so that when the reamer 25 is placed in the canal 11 and the reamer tip contacts the first conductive medium 20 or single medium 15 (FIG. 1) at the apex 12, the locator electronic circuit completes the measurement of electronic resistance or impedance and the apical position locator 4 so indicates. Importantly, the resistance of the conductive medium is selected so that the electronic apical located senses the resistance. The inventor has found that the mere act of interposing a human hand in the circuit between the locator lead and the conductive medium may be sufficient for impedance matching and sensing by the locator. Optionally, the training device may be utilized along with x-ray machines and radiographic film to simulate the verification of the location of the apex 12 through simulation of the relative radio opacity of the periodontal ligament and bone by utilizing differing levels of radio opaque materials in the first conductive medium 20 and the second conductive medium 22.

Various forms of conductive media may be used as desired including thermoplastic resins, polymers and plasters with fillers such as carbonaceous material or metal fibers or flakes.

As will be apparent to persons skilled in the art, various additional modifications, adaptations and variations of the foregoing specifically disclosed embodiment and method for training in use of an apical position locator may be made without departing from the objectives and scope of the present invention. Various modifications and changes may be made to the embodiment disclosed herein by those skilled in the art and such are contemplated by the present invention and are to be understood as included within the spirit and scope of the appended claims.

What is claimed and desired to be secured by Letters Patent is:

1. A fixture device for training in the use of an electrical apical position locator comprising:
   a) a tooth having a root with a root tip and a root canal, and having an apex generally coincident with said root tip;
   b) a fixture forming a container;
   c) a conductive medium partially radio opaque and mounting and supporting said tooth in said fixture and covering the root apex, said conductive medium selected for impedance compatibility with an electrical apical position locator so as to simulate human tissue for operation of the electrical apical position locator.

2. A fixture device for training in the use of an electrical apical position locator comprising:
   a) a tooth having a root with a root tip and a root canal, having an apex generally coincident with said root tip;
   b) a first partially radio opaque conductive medium applied to said root and covering said root apex;
   c) a fixture container receiving said tooth with said first conductive medium covering the root apex thereof and including a second partially radio opaque conductive medium mounting and holding said tooth in said fixture.

3. A method for preparing a device for training in the use of an electrical apical position locator, comprising the steps of:
   a) providing a tooth having a root with a tip and a root canal, having an apex generally coincident with said root tip;
   b) applying a first partially radio opaque conductive medium to said root and covering said root canal apex;
   c) mounting and supporting said tooth with said first conductive medium in a fixture forming a container in a second partially radio opaque conductive medium;
   d) electronically connecting an electronic apex locator to a reamer and to said second conductive medium;
   e) extending said reamer into said tooth root canal until the reamer tip contacts said first conductive medium to complete a path between leads of said apical position locator, thereby enabling the user to determine the location of the root apex.

4. A method for preparing a device for training in the use of an electrical apical position locator, comprising the steps of:
   a) providing a tooth having a root with a tip and a root canal, having an apex generally coincident with said root tip;
   b) mounting and supporting said tooth in a fixture container by a partially radio opaque conductive medium selected to generally match the impedance of human tissue;
   c) electrically connecting leads of an electronic apex locator to a reamer and to said conductive medium;
   d) and using said device by extending said reamer into said root canal until the reamer tip contacts said conductive medium to complete a path between the leads of said apical position locator, thereby enabling the user to determine the apex position.

5. A method for preparing a device for training in the use of an electronic apical position locator comprising the steps of:
   a) providing a tooth having a root with a tip and root canal and having an apex generally coincident with said root tip;
   b) mounting and supporting said tooth in a fixture container by a partially radio opaque conductive medium;
   c) electrically connecting leads of an electronic apical locator respectively to a reamer probe and to said conductive medium;
   d) and using said device by inserting said reamer probe into said root canal until the reamer probe tip encounters said conductive medium to complete a path between the leads of said apical position locator, thereby enabling the user to determine the apex position.

6. The method set forth in claim 5 wherein the conductive medium has a volume resistivity in the range from 10E15 to 10E-3 ohm/cm.

7. A fixture device for training in the use of an electrical apical position locator comprising:
   a) a tooth having a root with a root tip and a root canal, having an apex generally coincident with said root tip;
   b) a first conductive medium applied to said root and covering said root apex;
   c) a fixture receiving said tooth with said first conductive medium covering the root apex thereof and including a second conductive medium for holding said tooth in said fixture;

d) a reamer extending into said root canal, and having a reamer tip generally coincident with said apex;

e) an electronic apical position locator electronically connected to said reamer for sensing when said reamer tip contacts said first conductive medium.

8. A method for training in the use of an electrical apical position locator, comprising the steps of:

a) providing a tooth having a root with a tip and a root canal and having an apex generally coincident with said root tip;

b) supporting said tooth in a fixture by a conductive medium having a volume resistivity in the range from 10E15 to 10E-3 ohm/cm;

c) electrically connecting leads of an electronic apical locator respectively to a reamer probe and to said conductive medium;

d) inserting said reamer probe into said root canal until the reamer tip encounters said conductive medium to complete a path between the leads of said apical position locator, thereby enabling the user to determine the apex position; and e) interposing a human body part such as the user's hand, between said leads and said conductive medium in order to obtain an impedance sensed by said locator.

* * * * *